United States Patent [19]

Barnett et al.

[11] 4,130,155
[45] Dec. 19, 1978

[54] SELF TIGHTENING CONNECTOR FOR NON-SKID TIRE CHAINS

[76] Inventors: Forest H. Barnett, 2602 N. Baltimore, Tacoma, Wash. 98407; Clarence E. Barnett, 5208 - 156th NE., Redmond, Wash. 98052

[21] Appl. No.: 787,781

[22] Filed: Apr. 15, 1977

[51] Int. Cl.² ............................................. B60C 27/10
[52] U.S. Cl. ................................... 152/217; 152/219; 152/231
[58] Field of Search ............................... 152/217–219, 152/213, 221, 231; 254/51; 403/107, 108

[56] References Cited

U.S. PATENT DOCUMENTS

| | | | |
|---|---|---|---|
| 1,247,760 | 11/1917 | Wengrat | 152/219 |
| 1,859,656 | 5/1932 | Cunnington | 152/221 |
| 3,056,444 | 10/1962 | Kloszewski | 152/221 |
| 4,055,210 | 10/1977 | Mongault | 152/231 |

Primary Examiner—Albert J. Makay
Assistant Examiner—Lawrence E. Williams

[57] ABSTRACT

This connector comprises a bar shaped frame part and a U-shaped frame part that fits over and is slidable relatively one to another on the bar shaped parts. One frame part has in it a slot that extends lengthwise therein and has ratchet teeth that extend into the slot and the other part carries a pin that can engage with the teeth like a pawl to lock the two parts against relative movement in one direction. The two frame parts are connected with each other by elastic rubber tension members which yieldingly urge the frame parts toward a retracted position. Non-skid tire chains equipped with these connectors can be applied to tires without jacking up the wheels and the connectors will tighten the chains and hold them tight as soon as the wheel begins to move. Also, we disclose a non-skid assembly having traction pads of flat pliable material and provided on their outer surfaces with knobs and cups to resist skids.

8 Claims, 27 Drawing Figures

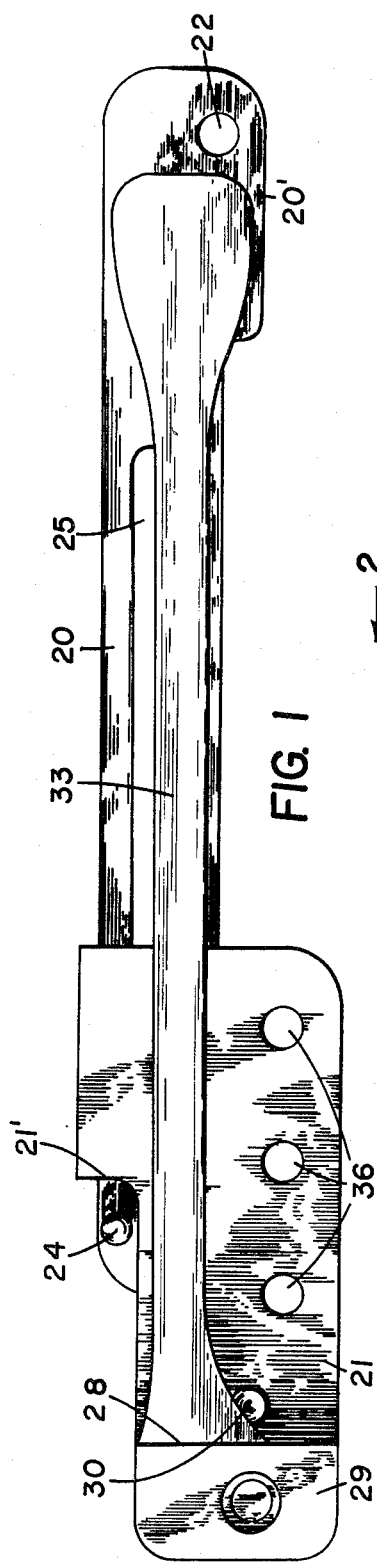
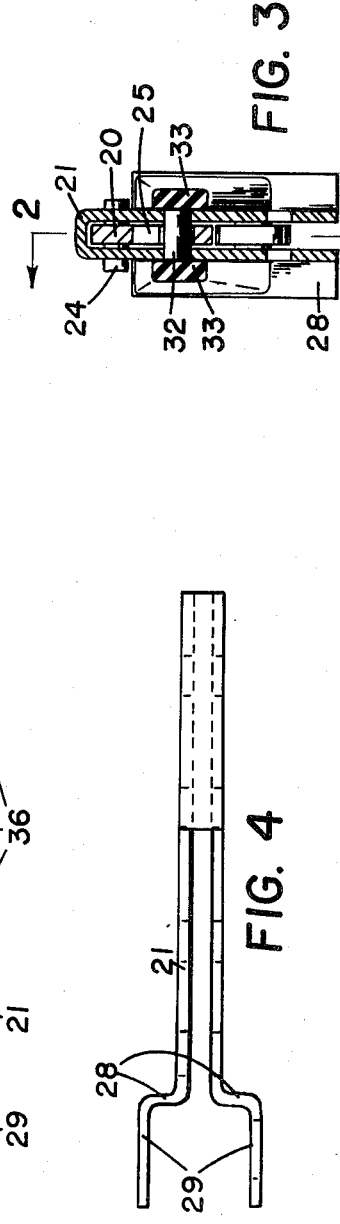
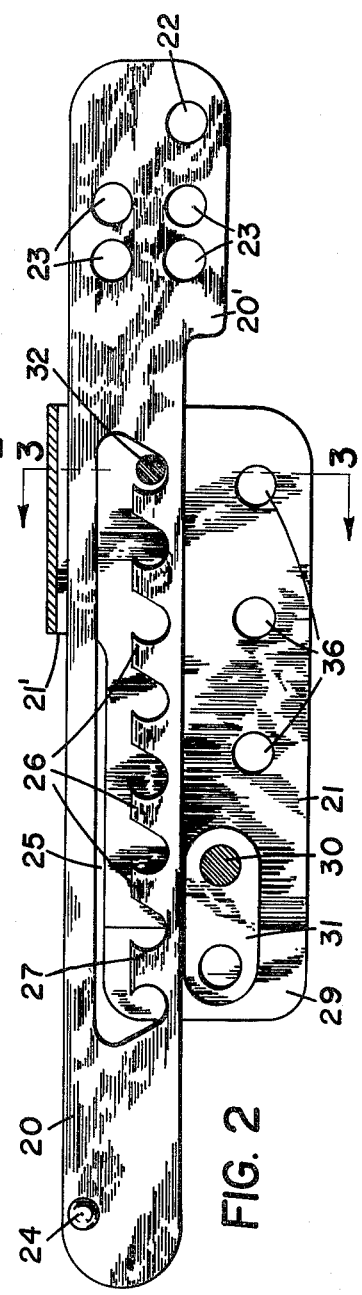

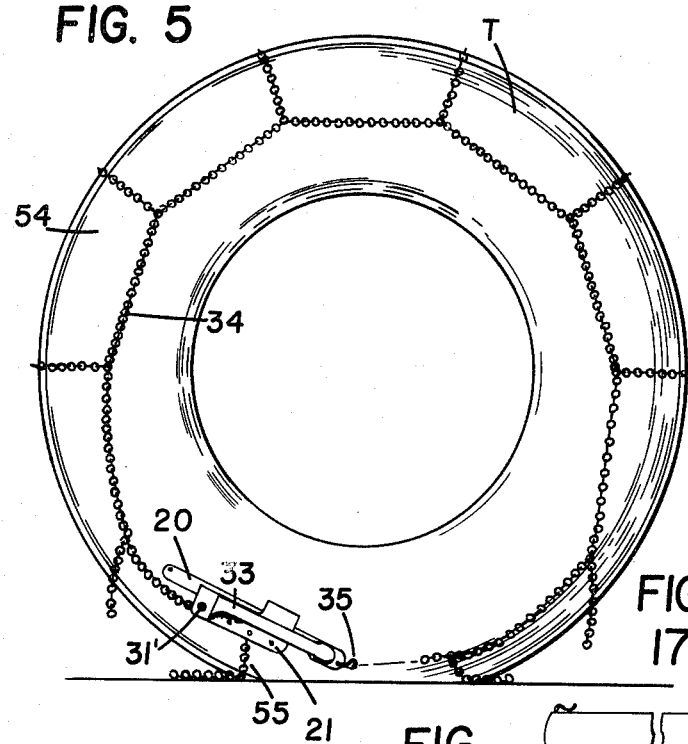
FIG. 5
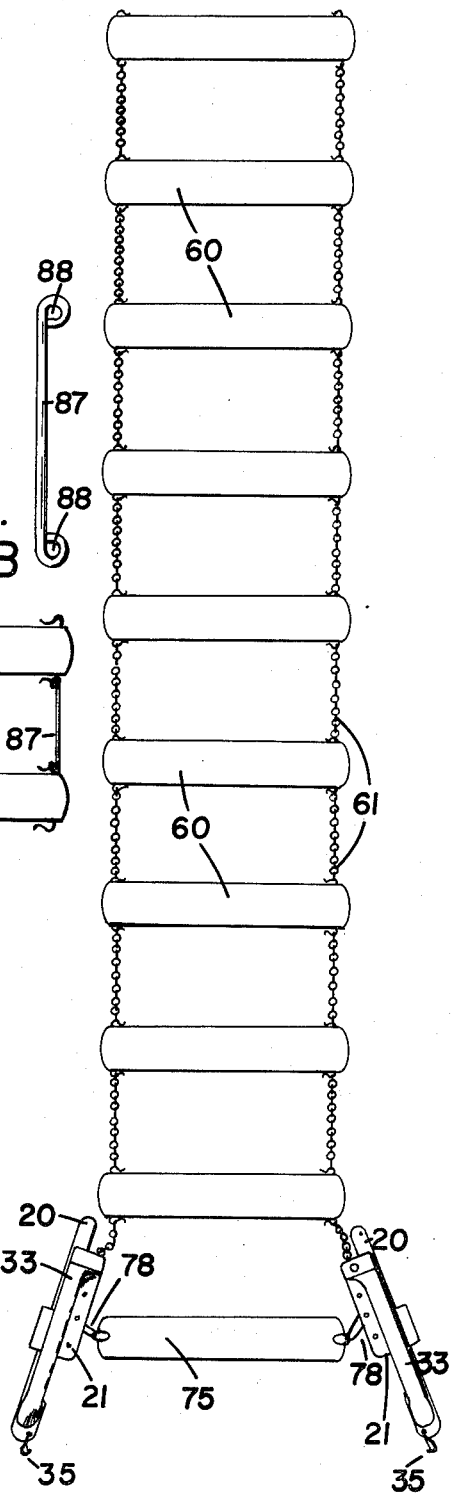
FIG. 17
FIG. 17B
FIG. 17A
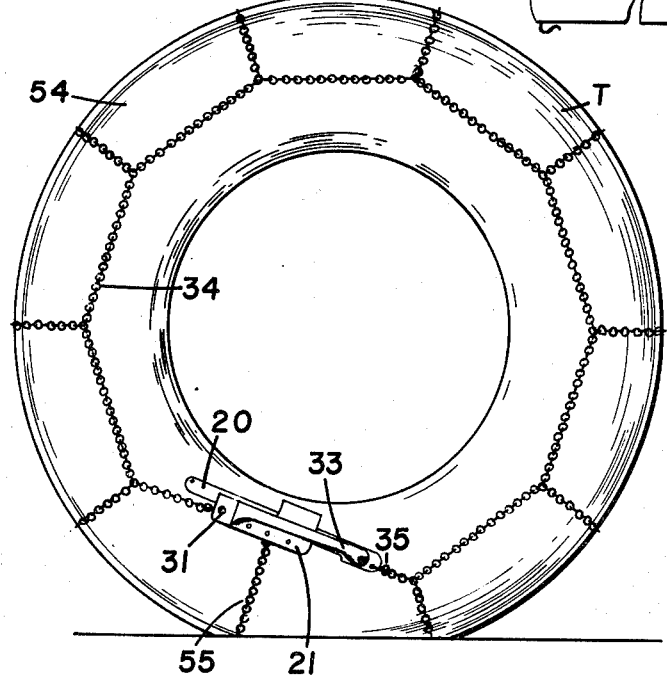
FIG. 6

SELF TIGHTENING CONNECTOR FOR NON-SKID TIRE CHAINS

SUMMARY OF THE INVENTION

In applying non-skid tire chains and like non-skid assemblies to tires it is usually necessary to lift or jack up the wheel to which the assembly is being applied. This can be an unpleasant and sometimes a dangerous task since the non-skid devices are usually used only when the weather is cold and the roads are covered with snow and ice. A general object of this invention is to provide a self-tightening connector member for use with a non-skid tire chain or like assembly which makes it possible to apply non-skid assemblies to tires without lifting them clear of the surfaces on which they rest.

Other objects are to improve self-tightening connector members of this type and to provide a connector member that is simple in construction, and inexpensive to manufacture because it is composed of few parts, which are easy to make by readily available tools and machines.

Another object is to provide a connector having in it ratchet devices that are readily releasable by simple and easy manipulation of the main frame parts thereby doing away with the cost of providing and the inconvenience of using ratchet trip devices such as triggers, push buttons and the like.

Another object is to provide improved traction pads, or cross lugs for non-skid assemblies used on tires, said pads being flat and pliable and readily attachable to and detachable from linkage devices which cooperate with the pads in forming side chains of the assemblies, said pads having tread portions provided with knobs, and grooves and cups that are highly resistant to skidding and further to provide traction pads or cross lugs that are durable and long lasting and easy on the tires on which they are used and that do not produce objectionable noise or vibration when driven on bare pavement.

BRIEF DESCRIPTION OF THE DRAWINGS

FIG. 1 is a side elevation showing a preferred, form of this non-skid tire chain connector as it may appear when the parts thereof are in an extended position relative to each other.

FIG. 2 is a view partly in section and partly in elevation of the same taken approximately on line 2—2 of FIG. 3 and showing the parts of the device in a retracted position relative to each other.

FIG. 3 is a sectional view, with parts in elevation, taken on line 3—3 of FIG. 2.

FIG. 4 is a detached edge view of one frame part of the device.

FIG. 5 is a somewhat fragrammatic small scale view illustrating an application to a tire of a non-skid tire chain equipped with these connectors and showing a connector before it is fastened.

FIG. 6 is a view similar to FIG. 5 showing this connector after fastening of the same has been completed.

FIG. 17 is a spread out plan view of a non-skid assembly showing traction pads or cross lugs of flat pliable material connected by sections of side chain and showing two of these connectors attached to the side chains.

FIG. 17 A is a fragmentary plan view showing a traction pad of the type shown in FIG. 17 having side linkage of modified form attached to it.

FIG. 17 B is a detached side view of one of the side links shown in FIG. 17 A.

DESCRIPTION OF PREFERRED EMBODIMENTS

Figures 7, 8:
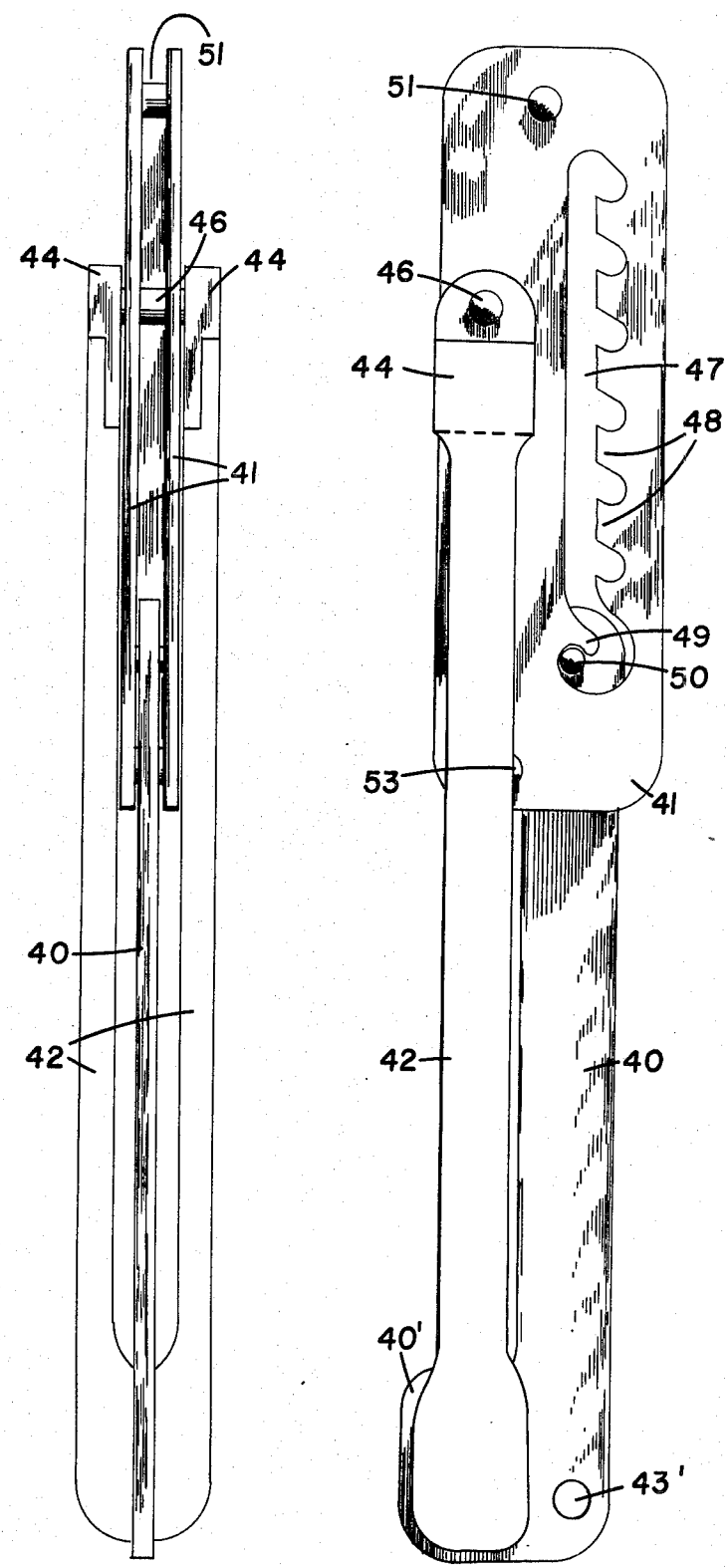
FIG. 7 is a view in side elevation showing a self-tightening connector of modified form as it may appear when in an extended condition.
FIG. 8 is an edge view of the connector shown in FIG. 7.

The connector shown in FIGS. 1 to 6 comprises a bar-shaped frame part, or frame bar 20 and a U-shaped frame part 21. The frame part 21 fits snugly over the bar 20 and is relatively movable lengthwise thereon. Also, part 21 has a limited transverse movement on bar 20. The bar 20 has a wider end portion 20' that is shown at the right in FIGS. 1 and 2. This wider end portion 20' has in it a transverse perforation 22 adapted to be connected with one end of a side chain 34 of a non-skid tire chain assembly and it also has a plurality of other perforations 23 which are useful in making a stronger and more durable connection with elastic tension members 33, as more fully hereinafter described. The end of the frame bar 20 shown at the left in FIGS. 1 and 2 is provided with a rigidly attached, transversely protruding stop pin - 24. Said bar 20 is also provided with a longitudinally extending slot 25 and with a plurality or set of ratchet teeth 26 which are integral with one wall of said slot and protrude into but not entirely across the slot. A tooth 27 of special shape is provided in the end portion of the slot shown at the left, FIG. 2.

The portions of two sides of U-shaped frame part 21 shown at the right in FIGS. 1, 2 and 4 are wider than are the portions of said sides shown at the left and the side walls of said wider portions are integrally connected at their edges shown, uppermost. The stop pin 24 is adapted to engage with edges 21' of these wider parts to limit relative movement of the two frame parts 20 and 21. The narrower portions of the sides of frame part 21 are outwardly offset to provide flat shoulders 28 and terminal parts 29. A transverse pin 30 pivotally connects a link 31 to part 21. Link 31 is connected by a pin 31' FIGS. 5 and 6 with a side chain 34. When frame parts 20 and 21 are in assembled relation across pin 32, that is rigid with the wider end of U-shaped frame part 21, and extends through the slot 25 in bar-shaped frame part 20 it cooperates in holding said frame parts in assembled relation. Said cross pin 32 cooperates like a pawl with the ratchet teeth 26 in controlling relative longitudinal movement of frame parts 20 and 21.

The link 31 also cooperates in holding parts 20 and 21 in assembled relation and in limiting relative tilting movement of said two frame parts.

Two elastic tension members 33 of strong and durable rubber or like material are provided at the respective sides of the frame parts 20 and 21. Each tension member 33 has one end thereof securely and permanently attached to one of the flat shoulder 28 of frame part 21 and the other end attached to the wider end portion 20' of bar-shaped frame part 20. Preferably we mold the ends of elastic members 33 to portions 20' of frame bar 20 so that, in the molding process, the rubber fills the holes 23 and becomes an integral part of the elastic members 33 on the two sides of the device. Preferably the other end of each elastic member 33 is vulcanized to the shoulders 28 of frame part 21.

Preferably the link 31 that is carried by the end of the frame part 21 shown at the left in FIGS. 1, 2, 5 and 6 is permanently connected by pin 31' with one end of a side chain 34 that is part of a non-skid tire chain assembly and the end of the frame bar 20 shown at the right is detachably connected, as by a snap 35, FIGS. 5, 6 and 17 with the other end of the same side chain.

Perforations 36 FIGS. 1, 2, 5, 6, and 17 are spaced to secure a cross chain 55 or pad 75. The choice of perforations to be used will depend on the spacing required to conform with that of side chains 34 and 61 or side linkage FIG. 17B.

The method of applying to a tire, a non-skid tire chain assembly which has two of these connectors secured to its respective side chains can be varied but one satisfactory method is as follows: when the tire chain assembly is not in use the elastic members 33 will normally hold the two frame parts 20 and 21 in the retracted position in which they are shown in FIG. 2. When the assembly is to be placed on a tire T the person applying the same, grasps the frame parts 20 and 21 of first one and then the other of the connectors, one in each hand, relatively tilts said frame parts enough so the pin 32 is clear of teeth 26 and, while holding said pin 32 clear of teeth 26, stretches the tension members 33 and relatively slidably moves the two frame parts to the extended position shown in FIG. 1. In this extended position the cross pin 32 will be engaged with reverse tooth 27 and will hold parts 20 and 21 in the extended position while the non-skid assembly is being placed over a tire T and the snaps 35 connected to the ends of the side chains 34 opposite to the ends thereof to which the connectors are attached. The pin 32 of each connector is then disengaged from its reverse facing locking tooth 27 and this leaves the tension members free to take up and hold any slack which occurs during use of the chain. It is to be noted that the tension members 33 yieldingly hold the pin 32 in engagement with ratchet teeth 26.

FIGS. 7 to 16 inclusive disclose a modified form of this connector in which the two relatively movable parts thereof are constructed and arranged so that leverage instead of a straight pull is applied in stretching the elastic tension members thereof. These Figs. disclose a self-tightening connector comprising a longer, flat, bar-shaped part 40 and a shorter U-shaped frame part 41 slidable relative to bar-shaped part 40.

Figure 9:
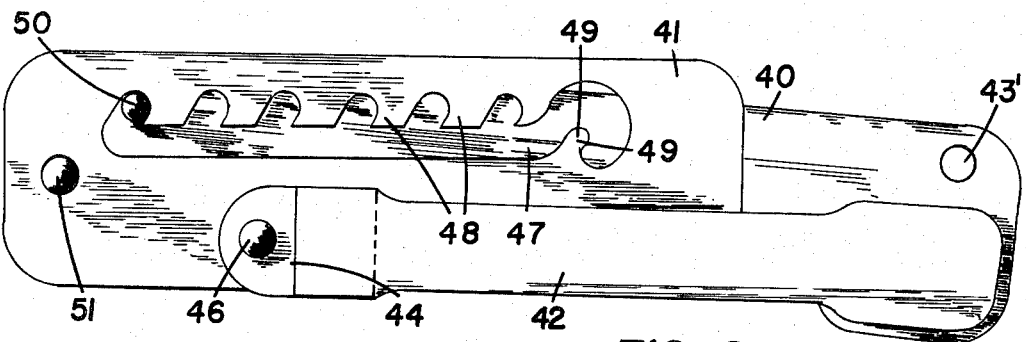
FIG. 9 is a view in side elevation showing the same connector with the parts thereof in a retracted position.

Two elastic tension members 42 connect the two frame parts 40 and 41. The tension members 42 normally urge said frame parts 40 and 41 into a retracted position in which said parts are shown in FIG. 9. The bar-shaped frame part 40 has a wider portion 40' at one end to which enlarged ends of the two elastic tension members 42 are fixedly and permanently secured. Preferably perforations 43 are provided in the wider end 40' of frame part 40 and the end portions of elastic members 42 are molded to said part 40', as hereinbefore explained in connection with tension members 33 of FIGS. 1 and 2. The other ends of the tension members 42 are permanently molded or vulcanized to terminal fittings 44 that are short and flat and preferably shouldered and have perforations 45 in their outer ends that fit over a transverse pivot pin or member 46 in the shorter frame part 41. Also, cross chain 55 here and after described is connected to pin 46. A notch 46' and perforations 46A are provided in part 41 to facilitate this connection.

Each of the two parallel sides of the U-shaped frame part 41 is provided with a longitudinally extending slot 47 and said slot 47 has ratchet teeth 48 along one side. The teeth extend into but not entirely across the slots 47. A single tooth 49 protrudes from the side of each slot 47 opposite to the side from which the ratchet teeth 48 protrude and is positioned near the end of said slot shown at the right in FIGS. 9, 10, and 11. Frame part 40 carries a rigidly attached cross pin 50 that is movable lengthwise in the slot 47 and is adapted to latch into engagement with the tooth 49 as shown in FIGS. 7 and 10.

Figure 10:
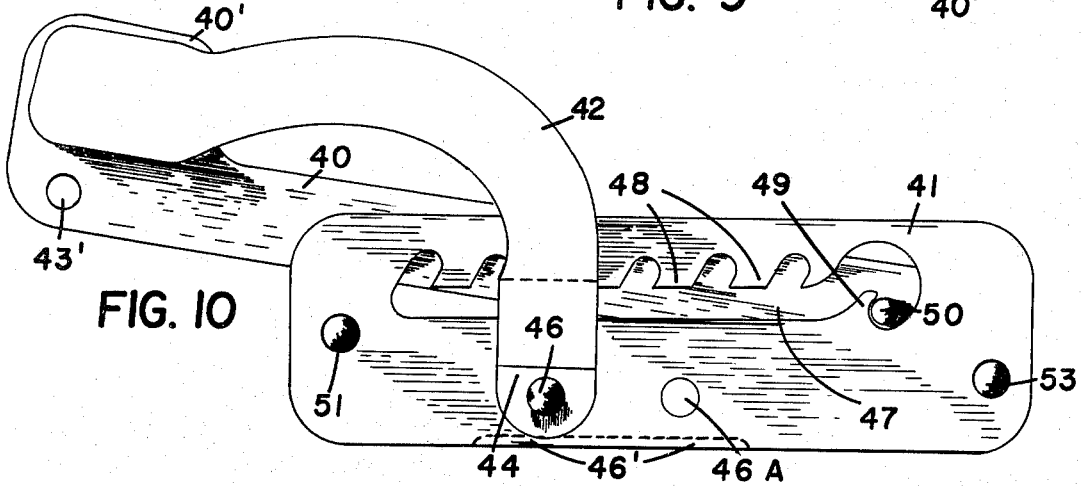
FIG. 10 is a view of the same in-side elevation showing the parts thereof in an intermediate position through which they are moved in stretching elastic tension members of the device.
Figures 11, 12:
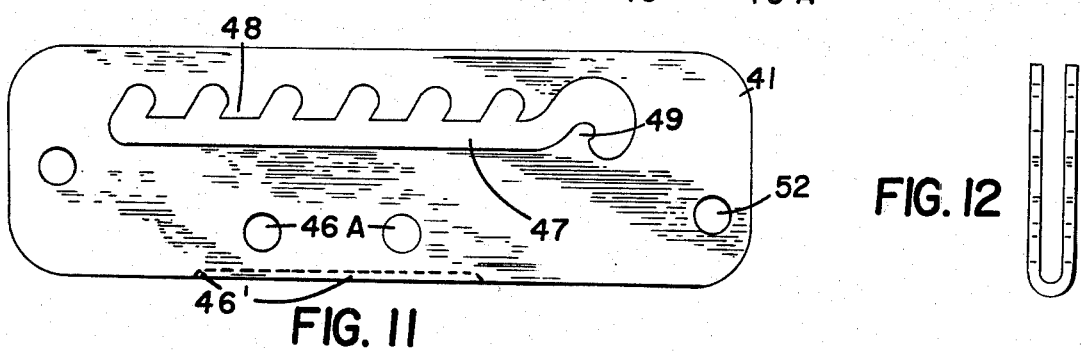
FIG. 11 is a detached side elevation of a U-shaped frame part of the same connector.
FIG. 12 is an end view of the frame part show in FIG. 11.
Figures 13, 14:
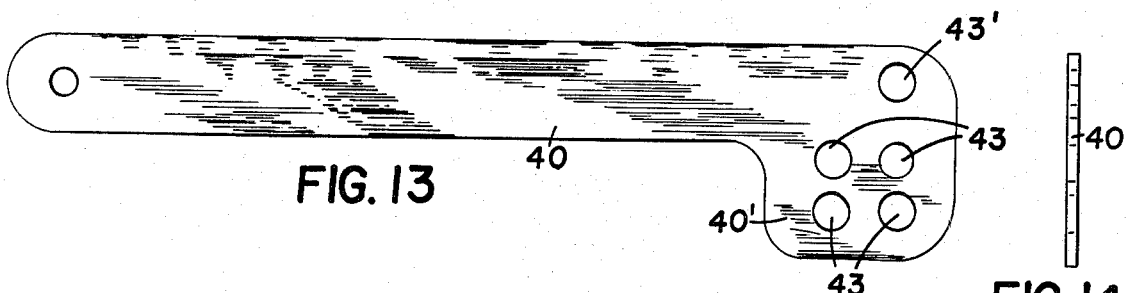
FIG. 13 is a detached side elevational view of a bar-shaped frame part of the same connector.
FIG. 14 is an end view of the frame part shown in FIG. 13.
Figures 15, 16:
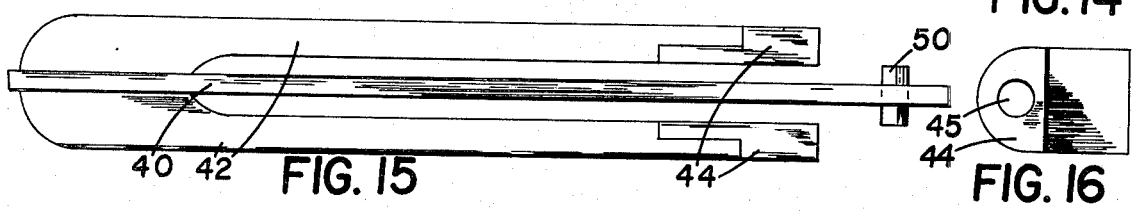
FIG. 15 is an edge view of the bar-shaped frame part shown detached in FIG. 13 and showing two elastic tension members each attached to it.
FIG. 16 is a detached view in elevation of a fitting by which an end of an elastic tension member is connected with the U-shaped frame part.
Figure 18:
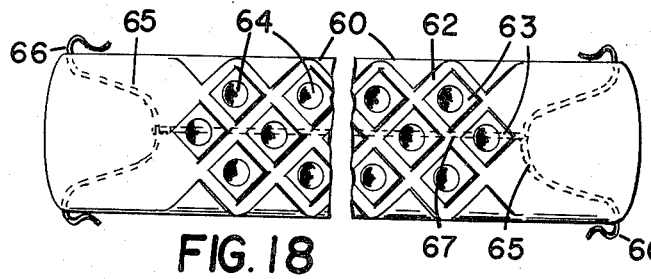
FIG. 18 is a detached plan view, with parts broken away, showing a traction pad or cross lug having reinforcing means of the form used in the assembly shown in FIG. 17.
Figure 19:
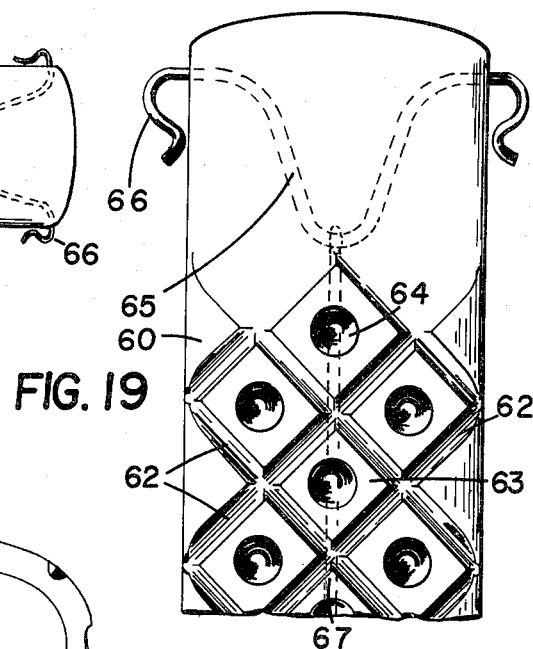
FIG. 19 is an enlarged fragmentary plan view showing a part of the traction pad shown in FIG. 18.

The end of frame part 41 shown uppermost in FIG. 7 and at the left in FIGS. 9, 10 and 11 is perforated to receive a cross pin 51 by which it can be connected with a side chain of a non-skid assembly. The perforation 43' in the outer end portion of frame part 40 is adapted to receive a readily attachable and detachable device, such as a snap, by which bar part 40 can be connected with the other end of the same side chain.

The elastic tension members 42 normally tend to move the two frame parts 40 and 41 to a retracted position in which they are shown in FIG. 9. In this position the cross pin 50 of bar 40 will be at one end of slots 47 of frame part 41 and in engagement with the end ratchet tooth 48. This will ordinarily be the condition of the assembly at the time it is to be applied to a tire. In applying it to the tire the tension members must be stretched and this can be done quickly and easily by grasping one frame part in each hand, pivotally moving the part 40 relative to the part 41 to the position shown in FIG. 10, in which position the pin 50 engages with special tooth 49, and then moving parts 40 and 41 to the position shown in FIG. 7. As part 40 is moved from the position shown in FIG. 9 to the position shown in FIG. 10 the pin 50 will move from left to right along slots 47 clear of ratchet teeth 48 until it latches into engagement with special tooth 49. Then as part 40 is moved from the position shown in FIG. 10 to the position shown in FIG. 7 the pin 50 will function as a pivot member, the two frame parts 40 and 41 will be slidably relatively moved and the tension members will be stretched. The detachable fastening means on frame part 40 can then be attached to the end of the side chain opposite to the end to which frame part 41 is secured and the two frame parts manipulated to detach the pin 50 from the special tooth 49 and leave it free to ride over the ratchet teeth 48 as the pull of the elastic members takes up any slack that may occur in the side chain.

A pin 53 in perforations 52 in part 41 limits relative tilting movement of frame parts 40 and 41.

Because the side chain connection perforation 22 in frame bar 20 and the side chain connection pin 30 in frame part 21 of the connector shown in FIGS. 1 to 6 and the corresponding perforation 43' and pin 51 of the connector shown in FIGS. 7 to 16 are, in each instance, offset sidewise relative to the line of the ratchet teeth 26 and pin 32 in FIGS. 1 to 6 and the corresponding ratchet teeth 48 and pin 50 in FIGS. 7 to 16 any pull exerted by the side chain 34 on the connector will always tend to tiltingly move the two frame parts in such a direction as to cause the pin 32 or the pin 50 to lock into engagement with the ratchet teeth 26 or 48. The pull of the longer cross chain 55 shown in FIGS. 5 and 6 also tends to hold the locking pin 32 in engagement with the ratchet teeth 26. The pull of the elastic tension members, in each instance, also tends to yieldingly hold the locking pin in engagement with the ratchet teeth but allows the pin to move, slidably in one direction, over the ratchet teeth to take up slack in the side chain. Constructing the parts so they operate as just hereinbefore described obviates the need for and the expense of providing ratchet controlling devices.

FIG. 17 shows a non-skid tire chain assembly in which traction pads 60 connected with each other by short sections or pieces 61 of link chain or a single link as shown in FIGS. 17A and 17B, are used in place of the usual side chains and cross chains. The traction pads 60 are shown on a larger scale in FIGS. 18 to 21 inclusive. Preferably these traction pads are formed of "POLYURETHANE" which is readily obtainable on the market, is not expensive and is strong and durable and can be molded to the desired shape. Said pads are flat on the inside and are shaped to conform to the curvature of the tires on which they are to be used. Their outer sides are shaped so as to provide a highly efficient skid resistant tread surface. This surface is formed by providing spaced apart grooves 62 which intersect each other at angles of approximately ninety degrees so they form outwardly protruding knobs 63 of generally square shape and by providing in each knob an approximately semispherical cup shaped recess 64. This provides a road contacting surface having good traction characteristics and that is highly efficient in preventing skidding.

Figure 20:
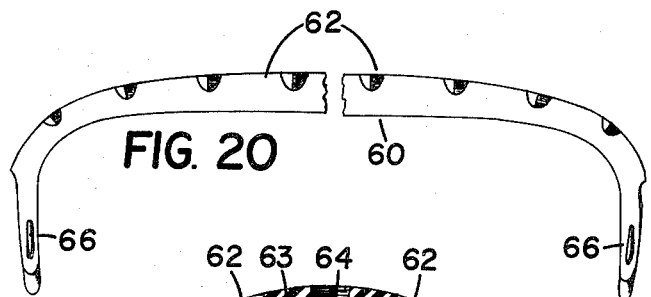
FIG. 20 is an enlarged edge view of the traction pad shown in FIGS. 18 and 19.
Figure 21:
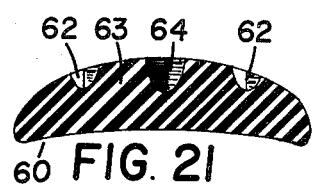
FIG. 21 is a cross sectional view of the traction pad shown in FIGS. 18, 19, and 20.

The pad 60 is shaped to conform to the transverse curvature of the tire, as best shown in FIG. 20, and it has a reinforcing member 65, which can be a spring steel wire, embedded in each end thereof. The reinforcing member 65 is of approximately U-shape and its two end portions are out turned and terminate in reversely bent hooks 66 which protrude from the edges of the pad 60 and have outwardly curved tips that lie close to the edges of the pad 60. The outwardly curved tips of hooks 66 provide an essential means for applying a greater pressure on pad 60 which consists of material only slightly resiliant to facilitate engaging the hooks 66 with the chains 61. A flexible reinforcing cable 67 is embedded in the pad 60 and extends lengthwise thereof and is secured to the two U-shaped loops in the respective ends of the pad 60.

Figure 22:
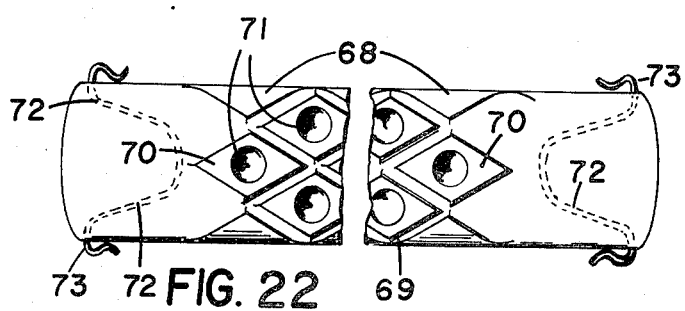
FIG. 22 is a plan view, with parts broken away, of a traction pad having reinforcing means and a tread design of modified form.

FIG. 22 shows a traction pad 68 similar to the pads 60 shown in FIGS. 17 to 21 except that its tread portion is formed by inclined grooves 69 which extend diagonally across the pad and intersect each other at angles of about sixty degrees thus forming knobs 70 of diamond shape. Knobs 70 have semi-spherical cups 71 in them. The pad 68 has a reinforcing member 72 similar to just described member 65 embedded in each of its opposite ends, and each member 72 terminates in hooks 73 which protrude from the edges of the pad 68 but no reinforcing wires are provided between the two members 72. The traction pads 60 shown in FIGS. 17 to 21 and the pad 68 shown in FIG. 22 are adapted to be connected with each other by the short sections 61 of link chain. When so connected the pads and reinforcing therein function as links and cooperate with the short chain sections 61 in forming the side chains of the assembly.

FIG. 17A shows how one piece links 87 each having an eye member 88 in each end thereof can be used in place of the short chain sections 61 with pads of the type shown in FIGS. 18 to 22. FIG. 17B is a detached view of a link shown in FIG. 17A.

The material of which all of the pads are formed is sufficiently elastic to allow the end links of the chain sections 61 to be engaged with the hooks of the pads and this material is firm enough to prevent their disengagement in ordinary use and handling.

Figure 23:
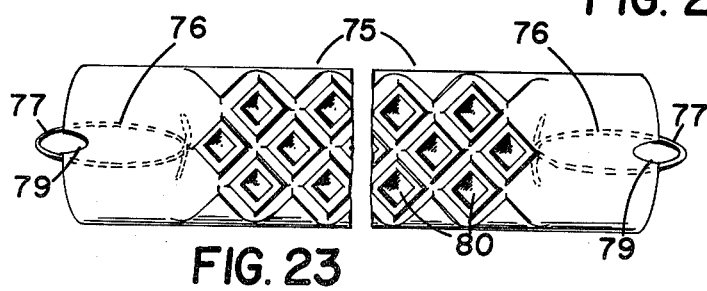
FIG. 23 is a plan view, with parts broken away, of a traction pad or cross lug of modified form and which is adapted for use between two of these connectors as shown in FIG. 17.

Because the connectors shown in FIGS. 1 to 6 and in FIGS. 7 to 16 are longer than is the usual distance between two cross chains in non-skid tire chain assemblies it is desirable to provide a longer cross chain or traction pad between the two connectors of each assembly. The cross chain 55 shown in FIGS. 5 and 6 is longer than are the other cross chains 54 shown in those figures. Also, FIG. 17 shows a traction pad 75 that is longer than are the other pads 60 shown in said FIG. 17. This pad 75, also shown in FIG. 23, had embedded in each end portion thereof an oval-shaped reinforcing and attachment loop 76. Each loop 76 protrudes from an end of the pad 75 and forms an eye member 77, that can be attached by means 78 to a connector part 21. A notch 79 is provided in a part of the pad 75 spanned by the end member 77 for clearance purposes. The tread of pad 75 differs from the tread of pad 60 in that the cups 70 therein are of square shape.

Figure 24:
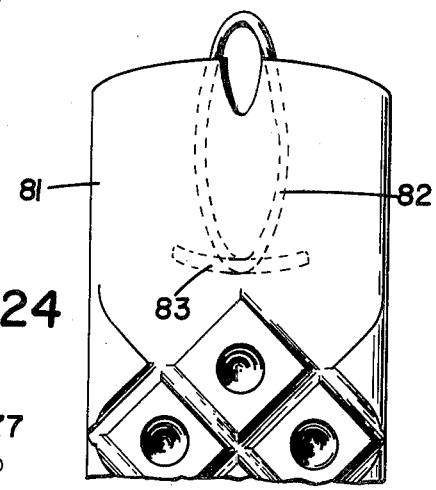
FIG. 24 is a fragmentary plan view, on a larger scale than FIG. 23, showing a traction pad that is generally similar to the pad shown in FIG. 23 but has a different tread design.

The pad 81 shown in FIG. 24 has embedded in it a reinforcing loop 82 formed in a single piece of wire with embedded inner ends 83 which are cross relative to each other.

Figure 25:
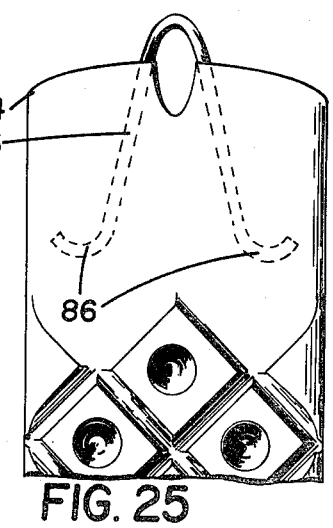
FIG. 25 is a fragmentary plan view of another traction pad having reinforcing and attachment loop means of modified form.

The pad 84 shown in FIG. 25 differs in that it has embedded in its end parts a reinforcing and attachment member 85 formed of a single piece of wire with outwardly curved ends 86.

We claim:

1. In a self-tightening connector for fastening together the two ends of a side chain of a non-skid tire chain assembly, a bar-shaped part of substantial length;

a U-shaped part fitting over the bar-shaped part capable of limited transverse movement on the bar-shaped part and movable longitudinally relative to the bar-shaped part between an extended and a retracted position; ratchet means comprising teeth carried by the bar-shaped part and a pin carried by the U-shaped part; elastic tension means interconnecting said two parts, yieldingly urging said two parts toward the retracted position, and when the connector is attached to a tire chain and mounted on a tire, cooperating with ratchet means in locking said two parts against relative longitudinal movement toward their extended position, said ratchet means being releasable by relative transverse movement of said two frame parts.

2. The self-tightening connector as claimed in claim 1 in which the elastic tension means comprises two rubber strips positioned along opposite sides of the two frame parts and each having one end portion secured to the bar-shaped part and the other end portion secured to the U-shaped frame part.

3. The self-tightening connector as claimed in claim 1 in which the U-shaped frame part is provided near one end with outwardly offset shoulders and the bar-shaped frame part is provided near one end with transverse perforations and in which the elastic tension means comprises two strips of rubber positioned along opposite sides of the bar-shaped frame part, each rubber strip having one end thereof vulcanized to one of said shoulders and the other end thereof molded to the perforated end portion of the bar-shaped part with integral parts of the rubber of which the two strips are composed extending through the perforations in the bar-shaped frame part.

4. In a self-tightening connector for fastening together the two ends of each of two flexible side chains of a non-skid tire assembly connected together by spaced apart traction members which extend across the tire when the non-skid assembly is operatively disposed on the tire, a self-tightening connector connecting the two ends of each side chain and comprising a bar-shaped frame part; a U-shaped frame part fitting over and slidable lengthwise relative to said bar-shaped frame part between a retracted position and an extended position, one of said frame parts having in it a longitudinally extending slot; ratchet teeth rigid with said slotted frame part and extending into said slot; a pin rigid with the other frame part and extending into said slot and movable into and out of engagement with said ratchet teeth, said pin preventing longitudinal movement in one direction of said two frame parts when it is engaged with said ratchet teeth; and elastic tension members connected between said two frame parts yieldingly urging said two frame parts toward a retracted position, the pull of said tension members urging said frame parts toward the retracted position and when attached to a tire chain and mounted on a tire cooperates in yieldingly holding said pin in engagement with said ratchet teeth, whereby slack in the side chain will be taken up and held.

5. The self-tightening connector as claimed in claim 4 in which the slot is provided in the bar-shaped frame part and the ratchet teeth are carried by the bar-shaped frame part and the pin is carried by the U-shaped frame part.

6. The self-tightening connector as claimed in claim 4 in which a slot is provided in each side of the U-shaped frame part and ratchet teeth are carried by the U-shaped frame part and the pin is carried by the bar-shaped frame part.

7. In a self-tightening connector for fastening together the two ends of a side chain of a non-skid tire assembly mounted on a tire, a bar-shaped frame part of substantial length; a U-shaped frame part fitting over and movable transversely of and longitudinally along and relative to said bar-shaped frame part; two longitudinally extending slots in the respective sides of said U-shaped frame part in registration with each other; ratchet teeth rigid with and protruding from one wall of each slot into said slot and terminating short of the other wall of the slot; a pivot tooth positioned near one end of each slot and protruding from a wall of the slot in an opposite direction from said ratchet teeth; a pin rigid with said bar-shaped frame part positioned near one end thereof and protruding from opposite sides of the bar-shaped frame part into the slots, the diameter of said pin being less than the distance between the tips of said ratchet teeth and the opposing walls of said slots, providing clearance for longitudinal movement of the pin in the slots, said pin pivotally interconnecting said two frame parts and serving as a pivot when it is in engagement with said ratchet teeth; and two elastic tension members positioned at opposite sides of said frame parts and each having its opposite ends connected with the respective frame parts, said tension members yieldingly urging said frame parts relatively toward a retracted position, the line of pull of the tension members being transversely offset relative to said ratchet teeth and pin whereby the pin is yieldingly urged into engagement with the ratchet teeth by the pull of said tension members, and means operable in connecting the outer ends of said two frame parts with the respective ends of a side chain.

8. The connector as claimed in claim 4 in which side chain connection means is provided in opposite ends of each frame part in a transversely offset position relative to the ratchet teeth and pin that engages said teeth, whereby a pull exerted by the side chain on the frame parts will tend to hold the ratchet tooth engaging pin in engagement with the ratchet teeth.

* * * * *